Patented Feb. 20, 1934

1,948,330

UNITED STATES PATENT OFFICE 1,948,330

METHOD FOR PREPARATION OF AROMATIC AMINES

William C. Calvert, Akron, Ohio, assignor to Wingfoot Corporation, Wilmington, Del., a corporation of Delaware No Drawing. Application April 15, 1931
Serial No. 530,427

13 Claims. (Cl. 260—130.5)

My invention relates to the preparation and purification of aryl amines. It has particular relation to a method of preparing such materials from nitro compounds. One of the objects of the invention is to provide a method of preparing aryl amines from nitro compounds in which method the formation of undesirable by-products is obviated; another, is to provide a simple and highly efficient method of purifying the compounds after they have been formed.

Heretofore, aryl amino compounds have been prepared from the corresponding nitro derivatives by subjecting the nitro compounds to reduction by means of nascent hydrogen evolved by the action of an acid, for example hydrochloric or sulphuric acid, upon such metals as iron, zinc or tin. In some cases, this method is undesirable in that the amines are formed in an acid medium which tends to react to form undesirable by-products.

This invention resides in the discovery that nitro compounds; e. g., the nitro benzenes, toluenes and naphthalenes, may be successfully and quickly reduced to the corresponding amino compounds by subjecting them to the action of finely divided iron in a solution of ammonium chloride. By employment of this method, the reacting solution may be maintained at all times in a neutral or even an alkaline state, thereby obviating undesirable side reactions.

This invention has been found to be highly satisfactory in the preparation of such compounds as 2-4-diamino diphenylamine from 2-4-dinitro diphenylamine. In practicing the invention, 100 grams of powdered 2-4-dinitro diphenylamine are added in small quantities to a thick paste of iron filings (500 parts by weight) formed by the addition of two per cent ammonium chloride solution to the filings. This mass should be stirred with moderate heating during the addition of the nitro compound. Small quantities of the ammonium chloride solution should be added from time to time, in order to maintain the consistency of the paste, until a total of about 250 cc. has been added. Toward the end of the reaction, a small quantity; e. g., 10 cc., of an inert organic solvent, such as acetone, is stirred in and finally the paste is dried down upon a hot plate.

The amino compound may then be separated from the dried material by extracting it with benzene or other suitable solvent in a continuous type extractor. The solution containing the amine should be concentrated to a volume of about 100 cc., after which it is allowed to cool. During the cooling the amine crystallizes out and may be removed from the solution by filtration. In order still further to purify the product, it may be washed with benzene and dried. Yields of 81.6% of the theoretically possible values have been obtained by this method. This material has a melting point of 129° C., whereas the purified product melts at a slightly higher temperature (131° C.). The extremely close correspondence between melting points of the product obtained by the above disclosed process and that of the chemically pure material indicates the relative purity of the first mentioned material.

The method of purification disclosed, namely, evaporating the reaction mixture to dryness and then subjecting it to extraction with an organic solvent, constitutes one of the important features of the invention. By this method, the formation of hydroxides of the iron employed in the reduction, together with other undesirable materials, is obviated. If the ordinary methods of purification are employed, in which the amino compound is extracted directly from the mother liquor, it is extremely difficult to remove those materials and as a result the yields obtained are greatly impaired.

Only the reduction of 2-4-dinitro diphenylamine has been discussed in detail. However, the same general method may be employed in reducing various other nitro compounds of the aryl class. A few of these materials may be listed as follows: nitro benzene, dinitro benzene, nitro toluene, dinitro toluene, nitro phenol, nitroaniline, nitro chlor benzene, nitro naphthylene, nitroso-beta-naphthol, nitroso mercaptobenzothiazole, dinitroso hydroxy diphenyl, nitro guanidine and nitro benzaldehyde.

The compounds obtained by reduction of certain of these materials are normally in liquid phase. An example of such compounds is aniline, which is obtained by the reduction of nitro benzene. In such cases, purification may be readily effected by subjecting the reaction mixture to a process of steam distillation.

Benzene and acetone have been specifically referred to as solvents for the amino compounds. However, it is to be understood that the invention is not limited to the use of those specific materials, but that in lieu thereof ethyl alcohol, chloroform, acetone, carbon bisulphide or other inert organic solvents may be substituted.

The reduction of the nitro compounds disclosed takes place with ease and in many, if not most cases, the reaction is exothermic, sufficient heat being given off to make unnecessary the application of external heat. As already pointed out, the reaction products are readily obtained in a high state of purity. The process of the invention is applicable to the preparation of a wide variety of organic amines, only a few illustrative examples of which are disclosed herein.

Although I have described only the preferred embodiments of the invention, it will be apparent to those skilled in the art that it is not limited thereto, but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method adapted for preparing primary aromatic amines which comprises subjecting a nitro-substituted aryl compound to reduction by means of finely divided iron and ammonium chloride.

2. A method adapted for preparing primary ammonia-substituted benzenes which comprises reducing the corresponding nitro-substituted benzenes by means of finely divided iron and ammonium chloride.

3. A method adapted for preparing primary ammonia-substituted aryl compounds which are solid at elevated temperatures comprising the steps of subjecting the corresponding nitro compound to reduction by means of finely divided iron and ammonium chloride, evaporating the reaction mixture to dryness, and extracting the ammonia-substituted aryl compound from the residue by means of an inert organic solvent.

4. A method of preparing diamino diphenylamine which comprises reducing dinitro diphenylamine by means of iron filings and ammonium chloride.

5. A method of preparing diamino diphenylamine which comprises reducing dinitro diphenylamine by means of finely divided iron and a solution of ammonium chloride, subsequently evaporating the mixture to dryness, and extracting it with an inert organic solvent.

6. A method adapted for extracting solid primary aromatic amines from a mixture including reaction products of a nitro aryl compound, iron and ammonium chloride which comprises evaporating the mixture to dryness and extracting it with an inert organic solvent.

7. A method of preparing 2-4-diamino diphenylamine which comprises treating 2-4-dinitro diphenylamine with ammonium chloride and finely divided iron.

8. A method of preparing 2-4-diamino diphenylamine which comprises treating 2-4-dinitro diphenylamine with ammonium chloride and finely divided iron, evaporating the reaction mass to dryness, and extracting it with an inert organic solvent.

9. A method adapted for preparing primary aromatic amines which comprises subjecting a compound of the formula $R(NO_x)_y$, in which R is an aryl group, $x$ is 1 or 2, and $y$ is no more than 2, to reduction by means of finely divided iron and ammonium chloride.

10. A method adapted for preparing primary aromatic amines which comprises subjecting a compound of the formula $R(NO_x)_y$, in which R is an aryl group, $x$ is 1 or 2, and $y$ is no more than 2, to reduction by means of finely divided iron and ammonium chloride, evaporating the reaction mixture to dryness, and extracting it with an inert organic solvent.

11. A method adapted for preparing primary aromatic amines which comprises subjecting a polynitro aryl compound to reduction by means of finely divided iron and ammonium chloride.

12. A method adapted for preparing primary aromatic amines which comprises subjecting a polynitroso aryl compound to reduction by means of finely divided iron and ammonium chloride.

13. A method adapted for preparing primary aromatic amines which comprises subjecting a nitroso aryl compound to reduction by means of finely divided iron and ammonium chloride.

WILLIAM C. CALVERT.